Patented Aug. 29, 1950

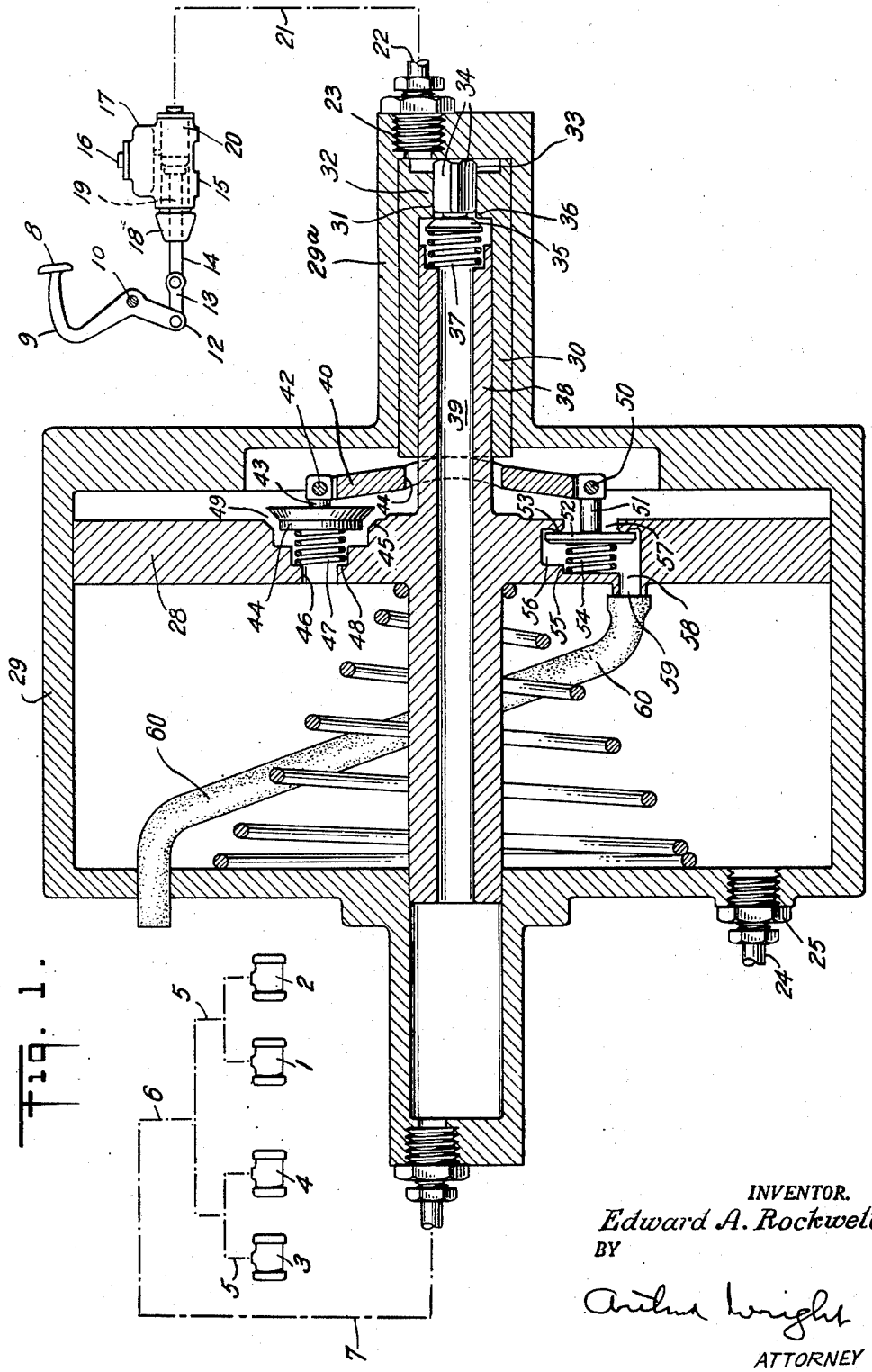

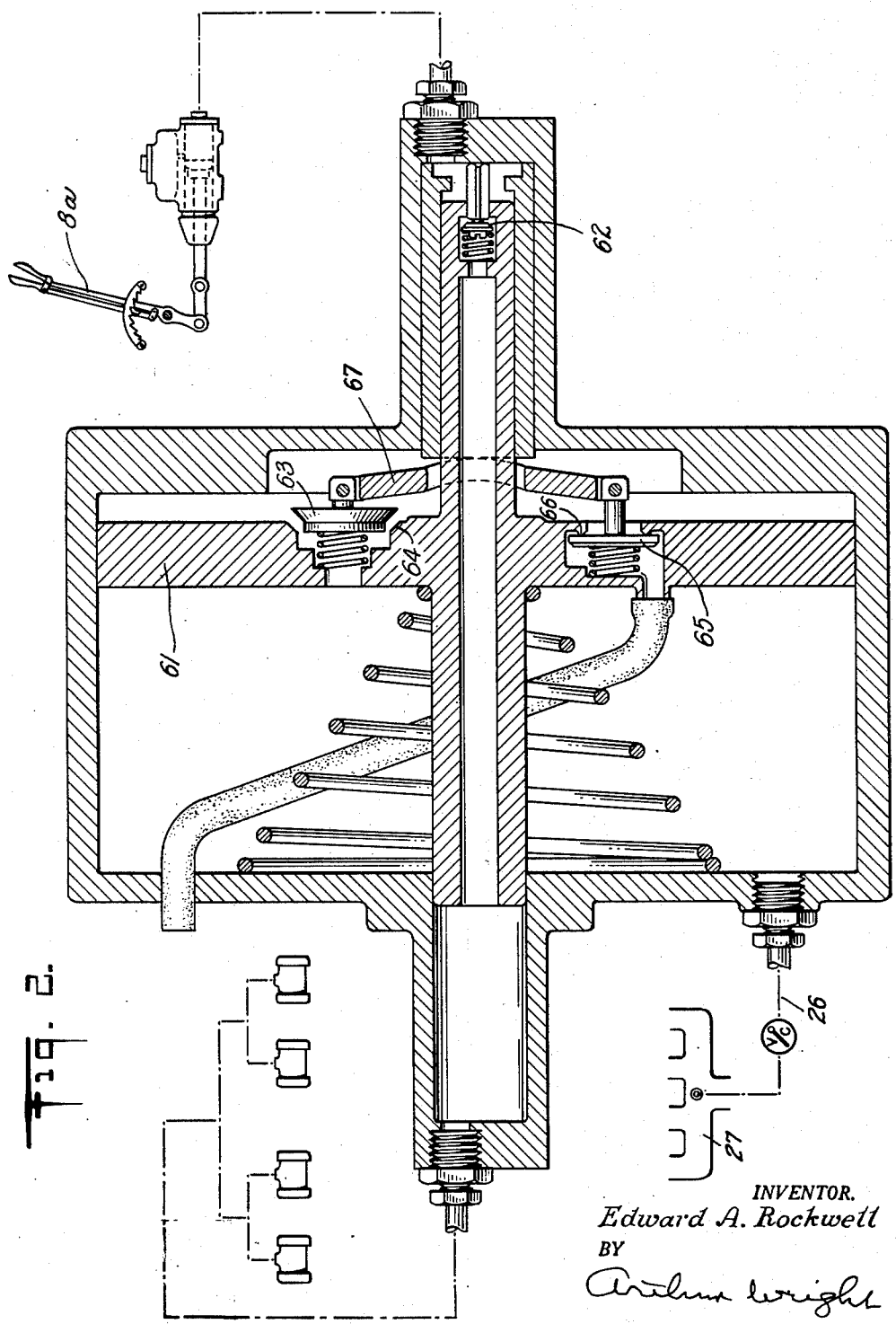

2,520,374

UNITED STATES PATENT OFFICE 2,520,374

FLUID OPERATED PRESSURE INTENSIFIER

Edward A. Rockwell, Shaker Heights, Ohio

Original application June 9, 1944, Serial No. 539,584. Divided and this application November 28, 1945, Serial No. 631,264

18 Claims. (Cl. 60—54.6)

My invention relates particularly to power units in compact form, that may be used to perform work, as for example in the operation of parts of automotive vehicles, such as brakes, etc.

This is a divisional application of my co-pending application Ser. No. 539,584 upon Self-Contained Power Unit, filed June 9, 1944.

The object of my invention is to provide a power unit which is capable of being used advantageously for the operation of any desired part to be moved and which is especially applicable to the operation of brakes in automotive vehicles, such for instance as automobiles, airplanes, etc. The object of my invention is also to provide a power unit in compact form for the operation of any desired part to be moved, as for example on automotive vehicles. Another object is to provide a unit of this character in such a manner as to obtain an effective ratio of input force to output force. A further object is to provide an effective means for obtaining liquid compensation in the parts which operate the power valves. Still a further object is to locate all of the controlling connections for the power unit at one end thereof. A further object is to locate all of the valves of the unit at the same end thereof. Again, a further object is to avoid the location of any valves in the power plunger. Still another object is to locate the valves in such a way as to provide no reaction or to obtain a reaction from the delivered high pressure only. Further objects of my invention will appear from the detailed description of the same hereinafter.

In carrying out my invention I preferably provide a movable differential pressure controlled by opposed oppositely seating inlet and outlet valves mounted on said wall and having a valve operating sleeve for said valves, a liquid compensation valve being provided, seating either on said sleeve or not according to whether a reaction is desired from the pressures delivered for work-performance.

While my invention is capable of being carried out in many different ways I have shown only certain forms of my invention in the accompanying drawings in which, diagrammatically shown, Fig. 1 is a longitudinal section of a power unit deriving its reaction only from the delivered hydraulic liquid; and Fig. 2 is a similar view of a power unit which is non-reactive.

In the drawings, referring first particularly to Fig. 1, I have shown an automotive vehicle having front wheel brake cylinders 1 and 2 and rear wheel brake cylinders 3 and 4 provided with hydraulic branch pipes 5 which are connected together by a hydraulic pipe system 6 having a pipe 7 to receive the hydraulic fluid of any desired character for operating the brake cylinders. On the automobile, there is the usual pedal 8 located on a pedal lever 9 carried by a pivot 10 on the automobile chassis, the same being provided with a retracting spring 11 of the usual kind (not shown) connected to the chassis. Instead there can be used, if desired, a hand lever 8a (see Fig. 2). Below the pivot 10 there is a pivotal connection 12 carrying a link 13 which is pivotally connected to the usual master cylinder piston rod 14 passing into a master cylinder 15 having at the upper portion thereof a vented filling cap 16 leading to a reservoir 17 forming a part of the master cylinder 15. Said master cylinder has the usual boot 18 around the piston rod 14, carrying a piston 19 in a cylinder 20 for delivering the hydraulic liquid from the master cylinder by a pipe 21 to an inlet opening 22 in a screw fitting 23, in the power unit. The vacuum is supplied to a passageway 24 in the power unit from a screw fitting 25 which communicates by a pipe 26 with a manifold 27 on the engine of the automobile (see Fig. 2).

In the form of my invention in Fig. 1, I have shown a piston 28 fitting within a cylinder 29. In this instance, I have provided on the cylinder 29 a smaller cylinder 29a having a plunger 30 within the same, which is provided with a cylindrical aperture 31, in an internal flange 32, through which there extends a valve operating rod 33 with intermediate liquid transmitting passages 34. The rod 33 is carried by a valve 35 which is pressed against a valve seat 36 on the interior of the sleeve 30 by means of a spring 37 seated at its forward end against a plunger 38, having a longitudinal passageway 39. The plunger 38 slides within the sleeve 30 and is arranged to rest against the rear end of a valve operating lever 40 having a central aperture 41 to permit the plunger 38 to pass through the same. The upper end of the valve operating lever 40 has a pivot 42 connecting it to a valve operating rod 43 on a valve 44 which seats against a valve seat 45 within the piston 28 which is connected by a passageway 46 to the chamber within the cylinder 29 at the left of the piston 28. A spring 47, supported on a seat 48, normally presses the valve 44 to the right so as to open port 49 leading from the valve seat 45 to the right face of the piston 28. The said valve 44, thus, normally conveys the vacuum from the left to the right face of the piston 28. The lower end of the valve operating lever 40 has a pivot 50 connecting it to a valve operating rod 51 on an air inlet valve 52 which is normally pressed against a valve seat 53 by a spring 54 carried by a recess 55 in a chamber 56 in the piston 28. The said chamber 56 has a port 57 connecting it to the right face of the piston 28 and has a passage 58 leading to a nipple 59 connected by a rubber tube 60 to a vent. This form of my invention shown in Fig. 1, thus, receives on the manual means the hydraulic reaction from the hydraulic liquid applied by the power unit to the wheel cylinders, but on account of the manner in which the valves are operated the manual means does not receive any substantial reaction from the modulating valve operating mechanism.

In the form of my invention shown in Fig. 2, I have provided a construction similar to that shown in Fig. 1. In this instance I have utilized a piston 61 and I have arranged the operation of the modulating valves differently, a liquid compensation and cut-off valve 62 being provided which is moved differently to eliminate reaction. In this instance, in Fig. 2, there is shown an emergency brake operating lever 8a instead of the pedal 8 of Fig. 1. Also, in this instance, embodying the modulating valve construction shown in Fig. 1, I have shown a vacuum admission valve 63 and a valve seat 64 therefor, which are the same as the vacuum admission valve 44, 45 of Fig. 1, and an air inlet valve 65 with a cooperating valve seat 66, which are the same as the valve 52, 53 of Fig. 1. Also, in this instance, I have provided a modulating valve operating lever 67 which is the same as the valve operating lever construction 40 in Fig. 1. In this form of my invention, owing to the mounting of the cut-off valve 62 on the piston 61 and the manner of operating and seating the valves 63, 64 and 65, 66 on the piston 61, no reaction is received on the manual means from the hydraulic liquid applied to the wheel cylinders nor from the valve mechanism controlling the inlet and outlet of the vacuum for applying the pressure to the liquid delivered to the wheel cylinders. Therefore, in this construction the apparatus is substantially a non-reactive travel control mechanism for applying hydraulic pressures from a power unit in the operation of the brakes or other parts to be moved thereby.

In the operation of the form of my invention shown in Fig. 1, it will be noted that the liquid compensation and cut-off valve 35, 36 is mounted on the valve operating sleeve 30 and that the sleeve 30 operates a simple type of non-reactive modulating valve mounting which does not receive a reaction from the air pressures admitted to the right of the piston 28, to any substantial extent, and the reaction of the manual means in this instance is the reaction from the hydraulic pressure liquid applied by the power from the power unit on the brake cylinders, acting on the sleeve 30 from the pressure liquid delivered by the pipe 7, and thence onto the pedal 8.

In the modification of my invention shown in Fig. 2, the operation is somewhat similar to the operation of the apparatus shown in Fig. 1 inasmuch as in this instance reactive modulating valves are not present but, the liquid compensation and cut-off valve 62 being mounted on the piston 61, there is substantially no reaction either from the valves or from the power hydraulic pressure liquid applied to the wheel cylinders, as the reaction is sustained by the power piston 61 and the power plunger mounted on the latter cutting off the pressure of the liquid from the manual lever 8a by means of the cut-off valve 62 which is carried by said power plunger so that, as a consequence, travel control without a reaction is attained in applying the power from the manual controlling means 8a by means of the power piston 61 to the wheel brake cylinders.

It will be noted that in both Figs. 1 and 2 the valve mounting exerts no substantial reaction on the manual means owing to the fact that the inlet valves 52, 53 and 65, 66, as well as the outlet valves 44, 45 and 63, 64, are mounted on the pistons 28 and 61 respectively, and thus move away from the manual means in the application of power in the power piston.

While I have described my invention above in detail, I wish it to be understood that many changes may be made therein without departing from the spirit of the same.

I claim:

1. A power unit comprising a movable wall, a chamber for said wall, a connection on the unit adapted to be connected to a source of pressure differing from the atmosphere, a venting connection, a valve means for controlling the application of the pressures from said source and from the venting connection to the movable wall, a plunger and a cylinder therefor located at one side of the movable wall, a hydraulic outlet for pressure liquid hydraulically connected to said cylinder, a hydraulic inlet for pressure liquid on the other side of the movable wall, a second plunger and a cylinder therefor hydraulically connected to said hydraulic inlet, having an annular portion subject to pressures from said inlet and outlet, located wholly on said other side of the movable wall, and a liquid compensating valve located in a passageway connecting the hydraulic inlet to the hydraulic outlet, and having a valve seat associated with the second-mentioned plunger.

2. A power unit comprising a movable wall, a chamber for said wall, a connection on the unit adapted to be connected to a source of pressure differing from the atmosphere, a venting connection, a valve means for controlling the application of the pressures from said source and from the venting connection to the movable wall, a plunger and a cylinder therefor located at one side of the movable wall, a hydraulic outlet for pressure liquid hydraulically connected to said cylinder, a hydraulic inlet for pressure liquid on the other side of the movable wall, a second plunger and a cylinder therefor hydraulically connected to said hydraulic inlet, having an annular portion subject to pressures from said inlet and outlet, located wholly on said other side of the movable wall, and a liquid compensating valve located in a passageway connecting the hydraulic inlet to the hydraulic outlet and having a valve seat associated with the first-mentioned plunger.

3. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, and a valve device for controlling the movement of the wall and arranged to be substantially free from reaction from said work-performing device, said valve device having a connection to said inlet for controlling the movement of the wall, said valve device connection comprising a valve-operating sleeve and cylinder around said extension.

4. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, and a valve device for controlling the movement of the wall and arranged to be substantially free from reaction from said work-performing device, said valve device having a connection to said inlet for controlling the movement of the wall, said valve device comprising an inlet valve leading to one side of the movable wall and having a flexible connection to the vent through said chamber and an outlet valve connected to said source and to the other side of the movable wall, said valve device connection comprising a valve-operating sleeve and cylinder around said extension.

5. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, and a valve device for controlling the movement of the wall and arranged to be substantially free from reaction from said work-performing device, said valve device having a connection to said inlet for controlling the movement of the wall, said valve device connection comprising a valve lever and a valve-operating sleeve and cylinder around said extension.

6. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, and a valve device for controlling the movement of the wall and arranged to be substantially free from reaction from said work-performing device, said valve device having a connection to said inlet for controlling the movement of the wall, said valve device comprising an inlet valve leading to one side of the movable wall and having a flexible connection to the vent through said chamber and an outlet valve connected to said source and to the other side of the movable wall, said valve device connection comprising a valve lever and a valve-operating sleeve and cylinder around said extension.

7. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, and a valve device for controlling the movement of the wall and arranged to be substantially free from reaction from said work-performing device, said valve device having a connection to said inlet for controlling the movement of the wall, said valve device connection comprising a floating valve lever and a valve-operating sleeve and cylinder around said extension.

8. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, and a valve device for controlling the movement of the wall and arranged to be substantially free from reaction from said work-performing device, said valve device having a connection to said inlet for controlling the movement of the wall, said valve device comprising an inlet valve leading to one side of the movable wall and connected to the vent and an outlet valve, seating in the opposite direction to the inlet valve, connected to said source and to the other side of the movable wall, said valve device connection comprising a floating valve lever and a valve-operating sleeve and cylinder around said extension.

9. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device connection comprising a valve-operating sleeve and cylinder around said extension, and a spring-pressed liquid compensating cut-off valve controlling said passage and having a valve seat on said sleeve.

10. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device comprising an inlet valve leading to one side of the movable wall and having a flexible connection to the vent through said chamber and an outlet valve connected to said source and to the other side of the movable wall, said valve device connection comprising a valve-operating sleeve and cylinder around said extension, and a spring-pressed liquid compensating cut-off valve controlling said passage and having a valve seat on said sleeve.

11. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device connection comprising a floating valve lever and a valve-operating sleeve and cylinder around said extension, and a spring-pressed liquid compensating cut-off valve controlling said passage and having a valve seat on said sleeve.

12. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device comprising an inlet valve leading to one side of the movable wall and connected to the vent and an outlet valve, seating in the opposite direction to the inlet valve, connected to said source and to the other side of the movable wall, said valve device connection comprising a floating valve lever and a valve-operating sleeve and cylinder around said extension, and a spring-pressed liquid compensating cut-off valve controlling said passage and having a valve seat on said sleeve.

13. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device connection comprising a valve-operating sleeve and cylinder around said extension, and a spring-pressed liquid compensating cut-off valve controlling said passage and having a valve seat on said extension.

14. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device comprising an inlet valve leading to one side of the movable wall and having a flexible connection to the vent through said chamber and an outlet valve connected to said source and to the other side of the movable wall, said valve device connection comprising a valve-operating sleeve and cylinder around said extension, and a spring-pressed liquid compensating cut-off valve controlling said passage and having a valve seat on said extension.

15. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device connection comprising a floating valve lever and a valve-operating sleeve and cylinder around said extension, and a spring-pressed liquid compensating cut-off valve controlling said passage and having a valve seat on said extension.

16. A power unit having an inlet for a hydraulic liquid under a controllable pressure, an outlet for hydraulic fluid leading to a work-performing device, a connection on the unit adapted to be connected to a source of fluid under a pressure different from the atmospheric pressure, a vent, a movable wall connected to said source and having a pressure increasing plunger, provided with an extension containing a passage therethrough leading to said inlet, connected to said wall, a cylinder for said plunger, said wall having a chamber in which it moves, a valve device for controlling the movement of the wall and arranged to be substantially free from reaction from said work-performing device, said valve device having a connection to said inlet for controlling the movement of the wall, said valve device comprising an inlet valve leading to one side of the movable wall and connected to the vent and an outlet valve, seating in the opposite direction to the inlet valve, connected to said source and to the other side of the movable wall, said valve device connection comprising a floating valve lever and a valve-operating sleeve and cylinder around said extension, and a spring-pressed liquid compensating cut-off valve controlling said passage and having a valve seat on said extension.

17. A power unit comprising a movable wall, a container for the wall, a source of fluid pressure connected thereto differing from the atmosphere, a venting connection to said wall through the container, substantially balanced inlet and outlet valves mounted on the movable wall to control the movable wall by the differential application of pressures from said source and vent, a pressure-increasing plunger having a cylinder associated with said movable wall, a hydraulic outlet for delivering hydraulic liquid from said plunger for work performance, an inlet for a hydraulic liquid having a controllable pressure, a valve operating sleeve around said plunger operated by said liquid having an operative connection to said valve and a hydraulic conduit leading from said inlet to said outlet through the sleeve and pressure-increasing plunger having a cut-off valve provided with a valve seat connection to the movable wall.

18. A power unit comprising a movable wall, a container for the wall, a source of fluid pressure connected thereto differing from the atmosphere, a venting connection to said wall through the container, substantially balanced inlet and outlet valves mounted on the movable wall to control the movable wall by the differential application of pressures from said source and vent, a pressure-increasing plunger having a cylinder associated with said movable wall, a hydraulic outlet for delivering hydraulic liquid from said plunger for work performance, an inlet for a hydraulic liquid having a controllable pressure, a valve operating sleeve around said plunger operated by said liquid having an operative connection to said valve and a hydraulic conduit leading from said inlet to said outlet through the sleeve and pressure-increasing plunger having a cut-off valve provided with a valve seat connection to the sleeve.

EDWARD A. ROCKWELL.

REFERENCES CITED

The following references are of record in the file of this patent:

UNITED STATES PATENTS

| Number | Name | Date |
| --- | --- | --- |
| 2,374,545 | Ingres | Apr. 24, 1945 |
| 2,377,699 | Klimkiewicz | June 5, 1945 |